US009838218B2

(12) United States Patent
Choi (10) Patent No.: US 9,838,218 B2
(45) Date of Patent: Dec. 5, 2017

(54) METHOD FOR PROVIDING OVERLAY NETWORK INTERWORKING WITH UNDERLAY NETWORK AND SYSTEM PERFORMING SAME

(71) Applicant: KT Corporation, Seongnam-si (KR)

(72) Inventor: Ki Man Choi, Daejeon (KR)

(73) Assignee: KT Corporation, Seongnam-si (KR)

( * ) Notice: Subject to any disclaimer, the term of this patent is extended or adjusted under 35 U.S.C. 154(b) by 41 days.

(21) Appl. No.: 15/031,533

(22) PCT Filed: Oct. 24, 2014

(86) PCT No.: PCT/KR2014/010065
§ 371 (c)(1),
(2) Date: Apr. 22, 2016

(87) PCT Pub. No.: WO2015/060683
PCT Pub. Date: Apr. 30, 2015

(65) Prior Publication Data
US 2016/0269198 A1    Sep. 15, 2016

(30) Foreign Application Priority Data

Oct. 24, 2013 (KR) .................. 10-2013-0127425
Oct. 24, 2014 (KR) .................. 10-2014-0144707

(51) Int. Cl.
*H04L 12/46* (2006.01)
*H04L 12/721* (2013.01)
*H04L 12/715* (2013.01)

(52) U.S. Cl.
CPC ...... *H04L 12/4633* (2013.01); *H04L 12/4641* (2013.01); *H04L 45/124* (2013.01); *H04L 45/64* (2013.01)

(58) Field of Classification Search
CPC ... H04L 12/4633; H04L 45/64; H04L 45/124; H04L 12/4641
See application file for complete search history.

(56) References Cited

U.S. PATENT DOCUMENTS

2013/0107887 A1    5/2013    Pearson et al.
2013/0163606 A1    6/2013    Bagepalli et al.
(Continued)

FOREIGN PATENT DOCUMENTS

KR    10-2012-0102626 A    9/2012
KR    10-2013-0052481 A    5/2013
(Continued)

OTHER PUBLICATIONS

International Search Report for PCT/KR2014/010065 dated Jan. 26, 2015.

*Primary Examiner* — Khaled Kassim
*Assistant Examiner* — Syed S Ali
(74) *Attorney, Agent, or Firm* — Sughrue Mion, PLLC (57) ABSTRACT

A method and a system for providing an overlay network interworking with an underlay network are disclosed. The method for providing the overlay network interworking with the underlay network comprises a method for providing an overlay based virtual network between data centers (DC) connected with a wide area network (WAN), the method comprises the steps of: identifying accessibility between a source customer system connected to a first network virtualization device included in a first DC and an object customer system connected to a second virtualization device included in a second DC by a network virtualization management device; transferring forwarding information obtained by interworking with the first network virtualization device to the second virtualization device by the network virtualization management device; and configuring a path so as to perform a tunneling process between the first
(Continued)

network virtualization device and the second network virtualization device using information on a WAN section and a control command by the network virtualization management device.

12 Claims, 8 Drawing Sheets

(56) References Cited

U.S. PATENT DOCUMENTS

| | | | | |
|---|---|---|---|---|
| 2013/0268357 A1* | 10/2013 | Heath | | H04L 63/00 705/14.53 |
| 2013/0304877 A1 | 11/2013 | Um et al. | | |
| 2013/0311637 A1* | 11/2013 | Kamath | | H04L 29/08576 709/224 |
| 2013/0343385 A1* | 12/2013 | Benny | | H04L 45/64 370/392 |
| 2013/0346592 A1* | 12/2013 | Kamble | | H04L 12/4633 709/224 |
| 2014/0241247 A1* | 8/2014 | Kempf | | H04L 12/4633 370/328 |
| 2014/0254603 A1* | 9/2014 | Banavalikar | | H04L 69/03 370/401 |
| 2014/0269274 A1* | 9/2014 | Banavalikar | | H04L 47/39 370/230 |
| 2014/0280949 A1* | 9/2014 | Anantharam | | H04L 67/1008 709/226 |
| 2015/0009995 A1* | 1/2015 | Gross, IV | | H04L 45/74 370/392 |
| 2015/0043383 A1* | 2/2015 | Farkas | | H04L 45/22 370/254 |
| 2015/0055651 A1* | 2/2015 | Shen | | H04L 12/1854 370/390 |
| 2015/0124590 A1* | 5/2015 | Chu | | H04L 45/22 370/225 |
| 2016/0285769 A1* | 9/2016 | Qiang | | H04L 41/08 |

FOREIGN PATENT DOCUMENTS

| | | |
|---|---|---|
| WO | 2011/056714 A2 | 5/2011 |
| WO | 2012/064054 A1 | 5/2012 |
| WO | 2013/029455 A1 | 3/2013 |

* cited by examiner

METHOD FOR PROVIDING OVERLAY NETWORK INTERWORKING WITH UNDERLAY NETWORK AND SYSTEM PERFORMING SAME

TECHNICAL FIELD

The present disclosure relates to a network virtualization, and more particularly to methods and apparatuses for providing overlay networks by interworking with underlay networks.

BACKGROUND ART

An overlay network may mean a virtual network configured over a physical network.

Figure 1:
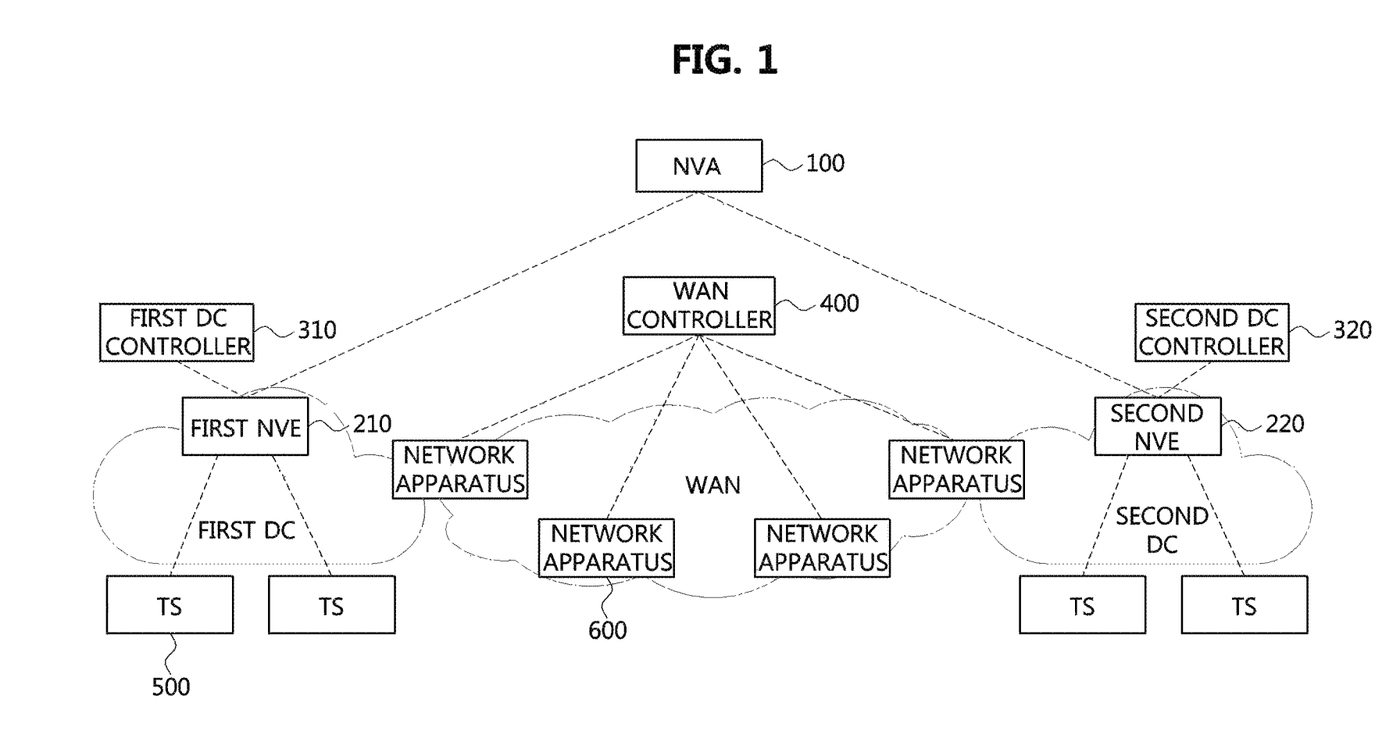
FIG. 1 is a conceptual view to explain a general system for providing an overlay network.

FIG. 1 is a conceptual view to explain a general system for providing an overlay network. Referring to FIG. 1, an overlay technology supporting configuration of an overlay network utilizes a network virtualization authority (NVA) 100 and a network virtualization edges (NVE) 210 and 220 in order to configure a virtual network.

Specifically, a total configuration of the network virtualization based on overlay is managed by the NVA 100, and the NVE 210 may receive information for overlay configuration from the NVA 100, and perform overlay functions such as encapsulation and decapsulation based on the information.

The NVEs 210 and 220, located in respective data centers (DC), are connected to a plurality of tenant systems (TS) 500, and the TSs may be elements such as servers, storages, etc.

Meanwhile, according to appearance of software defined networking (SDN) technologies which can flexibly control networks of a telecommunication operator, DC controllers 310 and 320 are responsible for network configuration and control functions within the respective DCs, and the NVEs communicate with the DC controllers 310 and 320 in order to request necessary information.

Also, in order to configure an underlay network located in a wide area network (WAN), a WAN controller 400 is responsible for configuration of network apparatuses 600 in the WAN, and controls functions for them.

However, information on configurations, operations, and statuses related to the underlay network, which are collected by the WAN controller 400, are still not utilized for configuration of the overlay network.

That is, a conventional technology related to the configuration of the overlay network focuses only upon configuration of an overlay network, regardless of available resources, operation statuses of network apparatuses, WAN paths, etc. of the underlay network.

Therefore, since the conventional technology configures an overlay-based virtual network regardless of failures occurring in the underlay network and network usage ratios for respective sections of the underlay network, efficiency of network resource usage cannot be guaranteed, and performance of virtual network also cannot be guaranteed.

DISCLOSURE

Technical Problem

The purpose of the present invention for resolving the above-described problem is to provide a method for providing an overlay network by interworking with an underlay network.

Another purpose of the present invention for resolving the above-described problem is to provide a system for providing an overlay network by interworking with an underlay network.

Technical Solution

In order to achieve the above-described purpose, as a method for providing an overlay network by interworking with an underlay network according to an aspect of the present invention, a method for providing an overlay-based virtual network between data centers (DC) connected with a wide area network (WAN) may comprise identifying, by a network virtualization authority (NVA), accessibility between a source tenant system (TS) connected to a first network virtualization edge (NVE) included in a first DC and a destination TS connected to a second NVE included in a second DC; transferring, by the NVA, forwarding information obtained by interworking with the first NVE to the second NVE; and configuring, by the NVA, a path by performing a tunneling procedure between the first NVE and the second NVE by using information on the WAN and a control command.

Here, the accessibility may be identified by updating a mapping table based on mapping information of the destination TS obtained by the NVA from the second NVE and mapping information of the source TS obtained by the NVA from the first NVE.

Here, in the identifying the accessibility, the first NVE may identify whether the source TS can access the destination TS or not by using the updated mapping table.

Here, the mapping information of the source TS may be mapping information between a virtual access point (VAP) and a virtual network instance (VNI) connected to the source TS, and the mapping information of the destination TS may be mapping information between a VAP and a VNI connected to the destination TS.

Here, the forwarding information may include information on a virtual network identifier (VNID) to be used for tunneling for configuring the overlay network, and the VNID is determined by the first NVE based on mapping information between the second NVE and the destination TS which is received from the NVA.

Here, the configuring the path may further comprise selecting, by the NVA, a path in the WAN based on information on the WAN which is received from a WAN controller controlling the WAN, and transferring information on the selected path to the first NVE; and transferring, by the NVA, the control command to a first DC controller controlling the first DC, a second DC controller controlling the second DC, and the WAN controller through the selected path.

Here, the configuring the path may further comprise receiving, by the NVA, a result according to the control command, and status information of the first DC, the second DC, and the WAN according to the control command, and updating network control management information managed by the NVA; and transmitting, by the NVA, the control command instructing the first NVE to perform the tunneling procedure based on the updated network control management information.

Here, the configuring the path may further comprise transferring, by the first NVE, a packet encapsulated based on the control command to the second NVE; and decapsulating, by the second NVE, the encapsulated packet, and configuring the path for configuring a virtual network with the first NVE.

Here, the information on the WAN may include information on available resources and available paths within the WAN.

Here, the control command may include a command for controlling a bandwidth and a Quality of Service (QoS) of the selected path.

In order to achieve the above-described purpose, as a method for providing an overlay network by interworking with an underlay network according to another aspect of the present invention, a method for providing an overlay-based virtual network between a first data center (DC) and a second DC connected with a wide area network (WAN) may comprise selecting, by a network virtualization authority (NVA), a path in the WAN based on information on the WAN which is received from a WAN controller controlling the WAN, and transferring information on the selected path to a first network virtualization edge (NVE) included in the first DC; and transferring, by the NVA, a control command for configuring an overlay network to a first DC controller controlling the first DC, a second DC controller controlling the second DC, and the WAN controller, through the selected path.

In order to achieve the above-described purpose, as a method for providing an overlay network by interworking with an underlay network according to yet another aspect of the present invention, a method for providing an overlay-based virtual network between data centers (DC) connected with a wide area network (WAN) may comprise receiving, by a first network virtualization edge (NVE), a control command for a tunneling procedure from a network virtualization authority (NVA); transferring, by the first NVE, a packet encapsulated base on the control command to a second NVE; and decapsulating, by the second NVE, the encapsulated packet, and configuring a path for configuring a virtual network with the first NVE.

Here, the control command for the tunneling procedure may be generated based on network control management information updated by using a path selected within the WAN based on information on the WAN which is received by the NVA from a WAN controller controlling the WAN.

Advantageous Effects

The above-described method and apparatus for providing an overlay network by interworking with an underlay network, according to the present invention, configure the overlay network based on information on available resources owned by the underlay network and network statuses of the underlay network, thereby enhancing performance of the overlay network.

In addition, through enhancement of the overlay network performance, overlay-based network virtualization services can be diversified.

BEST MODE

While the invention is susceptible to various modifications and alternative forms, specific embodiments thereof are shown by way of examples in the drawings and will herein be described in detail. It should be understood, however, that there is no intent to limit the invention to the particular forms disclosed, but on the contrary, the invention is meant to cover all modifications, equivalents, and alternatives falling within the spirit and scope of the invention. Like numbers refer to like elements in the accompanying drawings.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, it will be understood that when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments according to the present invention will be explained in detail by referring to accompanying figures.

Figure 2:
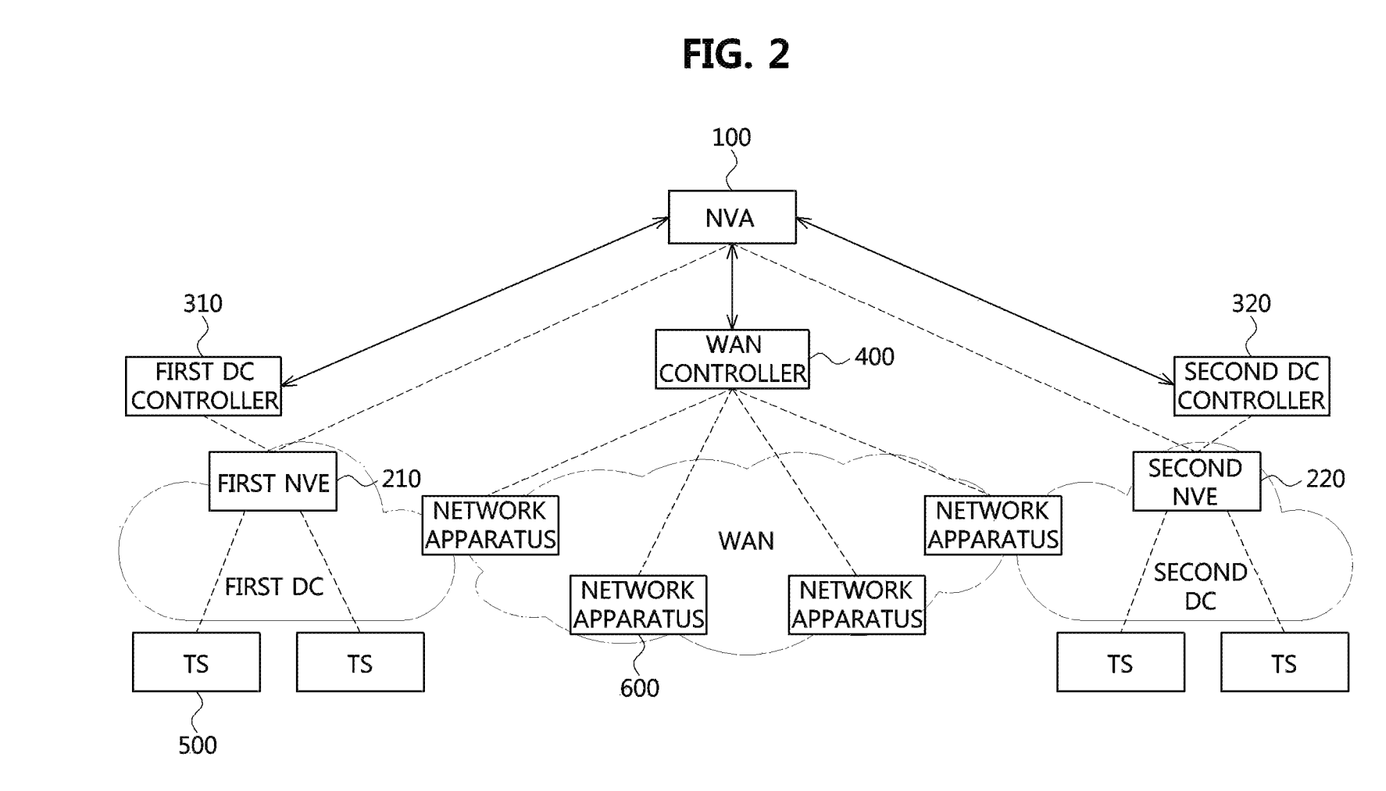
FIG. 2 is a conceptual view to explain a system for providing an overlay network by interworking with an underlay network according to an exemplary embodiment of the present invention.

FIG. 2 is a conceptual view to explain a system for providing an overlay network by interworking with an underlay network according to an exemplary embodiment of the present invention.

Referring to FIG. 2, unlike a conventional method in which a NVA communicates only with NVEs, in a method for providing an overlay network by interworking with an underlay network according to an exemplary embodiment of the present invention, a NVA 100 may communicate with DC controllers 310 and 320 which control respective DCs, and a WAN controller 400 which controls a WAN so that intra-DC and inter-DC information on network statuses and network operations can be utilized.

Specifically, the DC controllers 310 and 320 may perform configuration of networks in respective DCs, monitoring on resources, performances, and failures in respective DCs, control of bandwidths and QoS in respective DCs, management of information on TSs 500 and virtual network instances (VNI), monitoring on operation statuses (e.g. shutdown, migration, startup, etc.) of TSs, etc. For example, the first DC controller 310 may control a first DC, and the second DC controller 320 may control a second DC.

The WAN controller 400 may perform configuration of networks within the WAN, monitoring of resources, performances, and failures within the WAN, control of bandwidths and QoS within the WAN, path selection for the WAN, etc.

The NVEs 210 and 220 may perform functions for forwarding information on reachability to TSs connected to both ends of the overlay network and mapping information among TSs, virtual network identifiers (VNID), and NVEs, and functions of encapsulation and decapsulation for tunneling.

The NVA 100 may manage a mapping table storing information on NVEs, VNIDs, and TSs related to configuration of the overlay network through communications with the NVEs 210 and 220, and manage configuration of the overlay network by using the mapping table.

In addition, the NVA 100 may receive information on the WAN and information within the DCs through communications with the WAN controller 400 and the DC controllers 310 and 320, utilize resources of the underlay network by using the information, and configure the overlay network efficiently.

In order to configure the overlay network, a service discovery procedure, an address advertisement procedure, and a tunnel mapping and path setup procedure may be performed sequentially.

The service discovery procedure may mean a procedure for identifying possibility of service provisioning between a source TS and a destination TS.

Also, the address advertisement procedure may mean a procedure for forwarding mapping information between VNIDs and TSs to be used for tunneling between an ingress NVE and an egress NVE.

Also, the tunnel mapping and path setup procedure may mean a procedure for monitoring of available resources in the WAN located between the ingress NVE and the egress NVE, selection of a path within the WAN, and configuration of a path through tunneling using encapsulation and decapsulation for packet forwarding based on the overlay network.

The respective procedures will be explained in detail by referring to FIGS. 3 to 7. In FIGS. 3 to 7, the first DC controller and the first NVE operate in the first DC, the second DC controller and the second NVE operate in the second DC, and the WAN controller operates in order to control the WAN connecting the first DC and the second DC.

Figure 3:
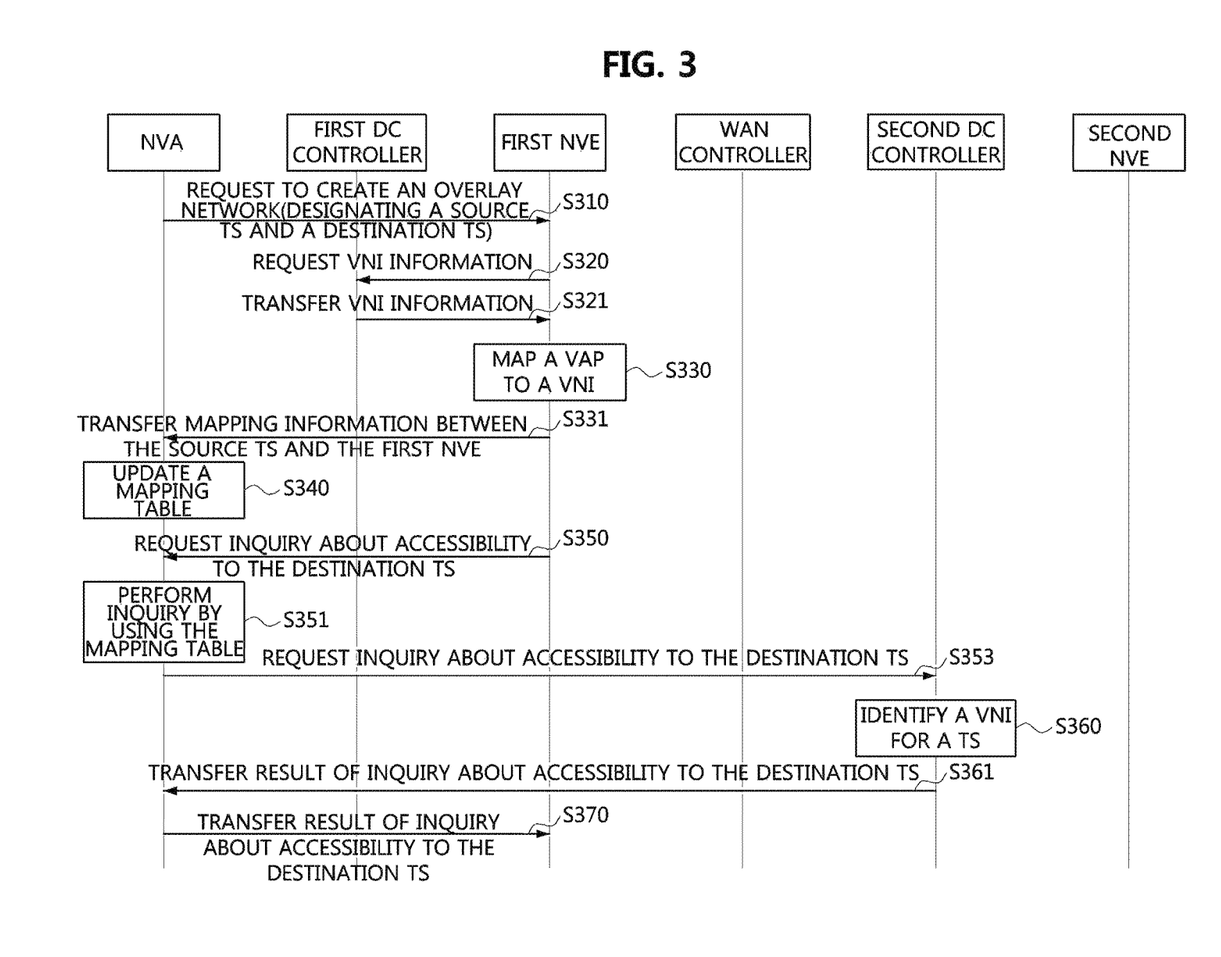
FIG. 3 is an exemplary view to explain a service discovery procedure for configuring an overlay network according to an exemplary embodiment of the present invention.

FIG. 3 is an exemplary view to explain a service discovery procedure for configuring an overlay network according to an exemplary embodiment of the present invention.

Referring to FIG. 3, a procedure for identifying possibility of service provisioning between a source TS and a destination TS will be explained.

According to an exemplary embodiment of the present invention, an overlay based virtual network between DCs, connected through a WAN, may be provided.

First, the NVA may identify accessibility between the source TS connected to the first NVE included in the first DC and the destination TS connected to the second NVE included in the second DC.

The above identification may be performed by the NVA by updating a mapping table based on mapping information of the source TS obtained from the first NVE and mapping information of the destination TS obtained from the second NVE. That is, it may be identified by the first NVE whether the source TS can access the destination TS or not by using the updated mapping table.

Here, the mapping information of the source TS may be mapping information between a virtual access point (VAP) and a virtual network instance (VNI) to which the source TS is connected.

Also, the mapping information of the destination TS may be mapping information between a VAP and a VNI to which the destination TS is connected.

Further detail will be explained as follows.

The NVA may designate the source TS and the destination TS. Also, at the same time, the NVA may request the first NVE to create an overlay network (S310).

The first NVE may request query of information on a VNI in which the source TS is included to the first DC controller (S320).

The first DC controller may transfer the VNI information requested by the first NVE to the first NVE (S321), and the first NVE receiving the VNI information may map a VAP to a VNI to which the source TS is connected (S330), and transfer mapping information between the first NVE and the source TS to the NVA (S331).

The NVA may update the mapping table by using the mapping information transferred from the first NVE (S340). Also, the second NVE may transfer the mapping information between the second NVE and the destination TS to the NVA by interworking with the second DC controller. Of course, the NVA may also update the mapping table by using the mapping information transferred from the second NVE. That is, the NVA may collect mapping information between respective NVEs and TSs by communicating with a plurality of NVEs managed by it, and update the mapping table by using the collected mapping information.

The first NVE may request inquiry about accessibility to the destination TS to the NVA (S350). Then, the NVA may identify the second DC controller managing the destination TS by referring to the mapping table (S351), and request inquiry about accessibility to a VNI of the destination TS to the second DC controller (S353).

According to the request of the NVA, the second DC controller may identify accessibilities to a VNI of the destination TS (S360), and transfer a result of the identification to the NVA (S361).

The NVA may transfer the result on accessibility to the destination TS, which is transferred from the second DC controller, to the first NVE (S370). Also, the NVA may update the mapping table by the transferred results on the accessibility to the destination TS.

Therefore, the first NVE may compete the service discovery procedure for configuration of overlay network by identifying accessibility to both the source TS and the destination TS.

Figure 4:
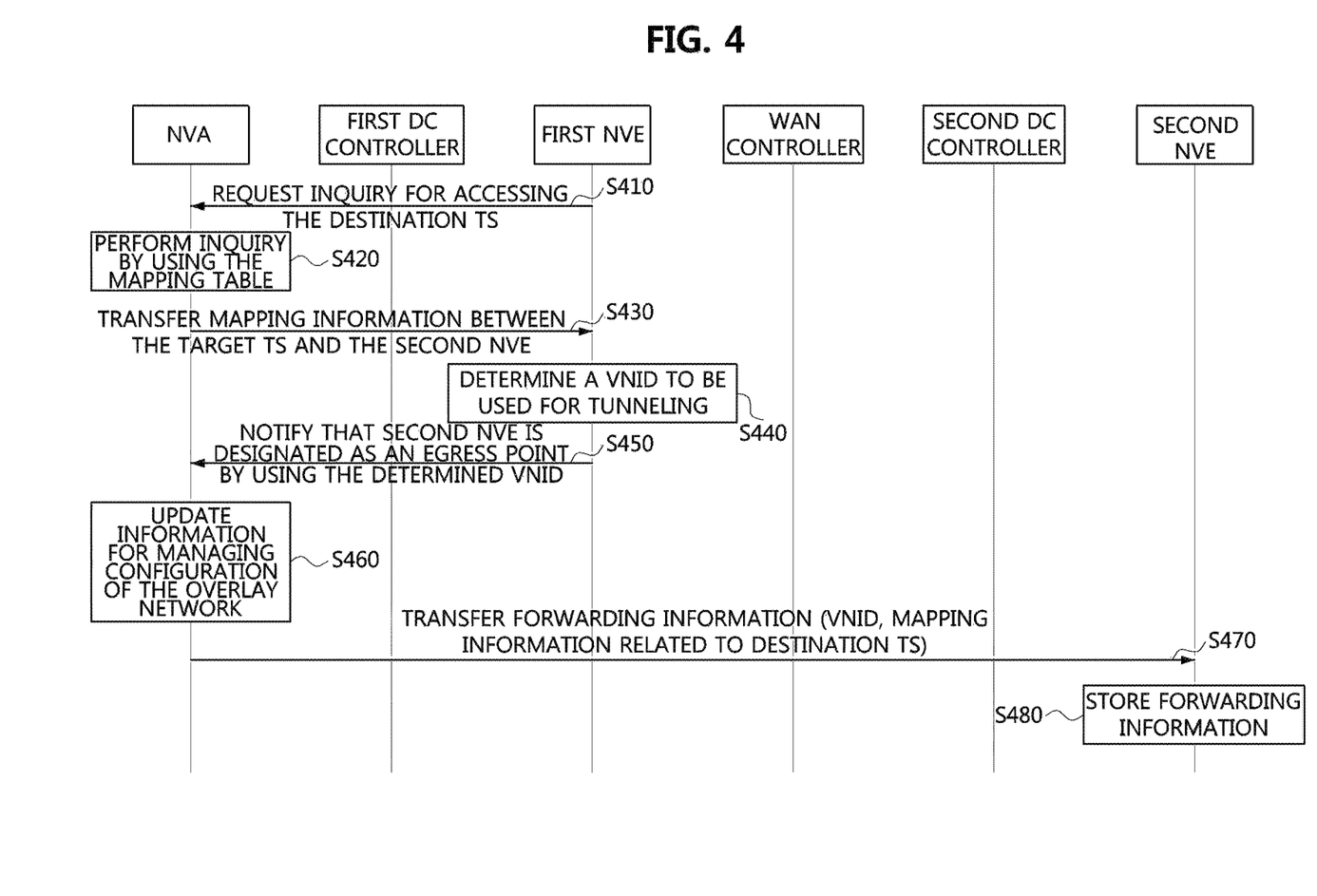
FIG. 4 is an exemplary view to explain an address advertisement procedure for configuration of overlay network according to an exemplary embodiment of the present invention.

FIG. 4 is an exemplary view to explain an address advertisement procedure for configuration of overlay network according to an exemplary embodiment of the present invention.

Referring to FIG. 4, a procedure of forwarding mapping information for a VNID, TS, etc., which will be used for tunneling between ingress NVE and egress NVE, will be explained.

After the service discovery procedure is completed, an address advertisement procedure may be performed.

The NVA may transfer forwarding information obtained by interworking with the first NVE to the second NVE. Here, the forwarding information may include information of a VNID which will be used for tunneling for configuring an overlay network. Also, the VNID may be determined by the first NVE based on the mapping information between the second NVE and the destination TS, which is received from the NVA.

Further detail will be explained as follows.

The first NVE may request the NVA to make an inquiry for accessing the destination TS (S410), and the NVA may perform the inquiry by using the mapping table (S420).

The NVA may transfer mapping information between the destination TS and the destination NVE (i.e. the second NVE), a result for the inquiry for accessing the destination TS which is obtained from the inquiry using the mapping table, to the first NVE (S430).

The first NVE may determine a VNID to be used for tunneling for configuring an overlay network (S440).

The first NVE may inform the NVA of that the second NVE is to be designated as an egress point by using the determined VNID (S450), and the NVA may update information for overlay network management by using the information transferred from the first NVE (S460). That is, when it is notified to the NVA that the overlay network is to be configured by designating the second NVE as an egress point, the NVA may update information for overlay network management by using the transferred information.

In addition, the NVA may transfer forwarding information (e.g. VNID and mapping information related to the destination TS), related to the overlay network configuration performed by designating the second NVE as an egress point, to the second NVE (S470). Accordingly, the second NVE may store the transferred forwarding information and manage the stored information (S480).

Figure 5:
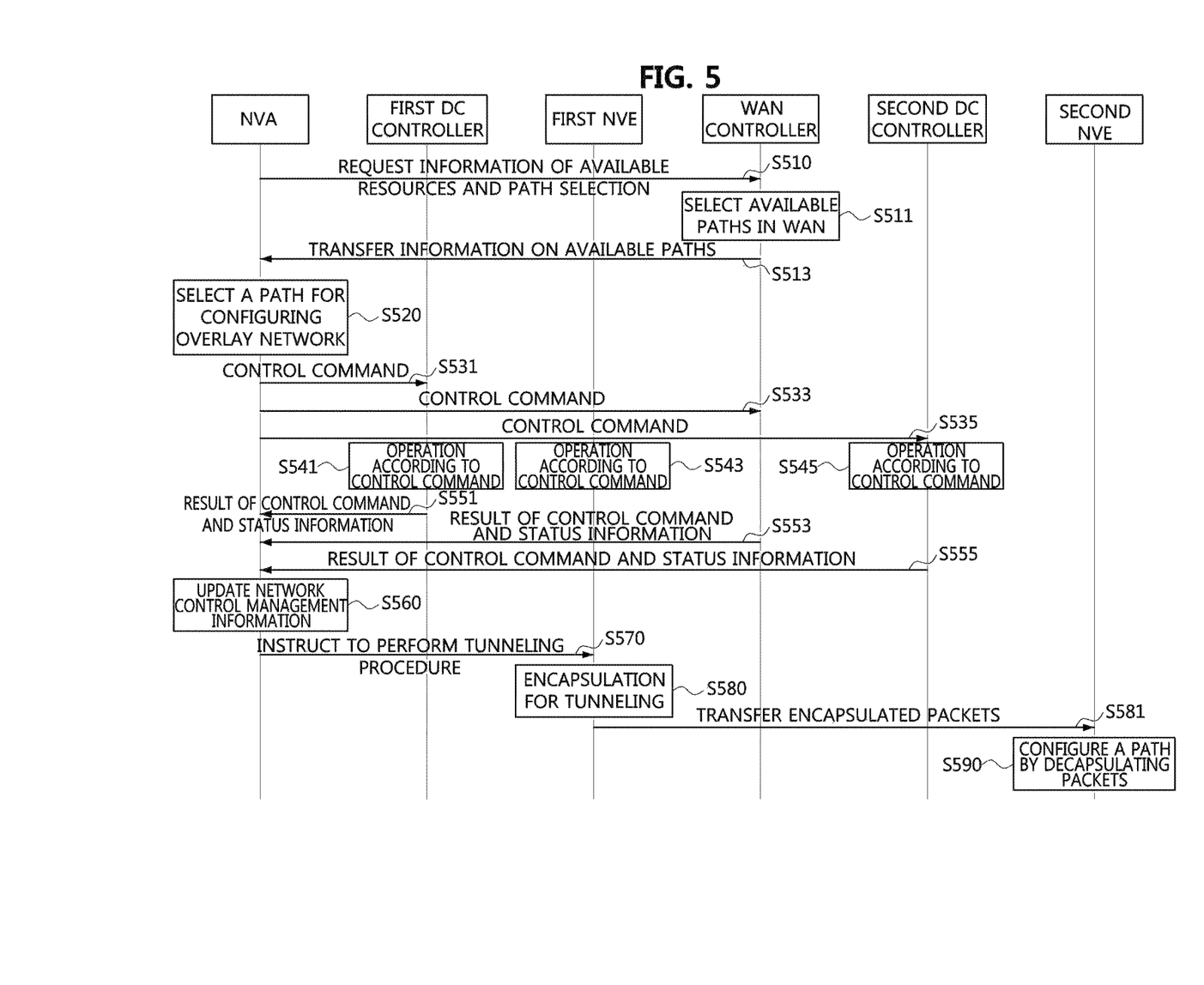
FIG. 5 is an exemplary view to explain a tunnel mapping and path setup procedure for configuring an overlay network, according to an exemplary embodiment of the present invention.

FIG. 5 is an exemplary view to explain a tunnel mapping and path setup procedure for configuring an overlay network, according to an exemplary embodiment of the present invention.

Referring to FIG. 5, a procedure for monitoring available resources and selecting a path in a WAN located between an ingress NVE and an egress NVE, and a procedure for configuring a path based on tunneling using encapsulation and decapsulation for overlay network based packet forwarding will be explained.

After the address advertisement procedure is completed, a tunnel mapping and path setup procedure will be performed.

The NVA may configure a path by performing a tunneling procedure between the first NVE and the second NVE by using information on the WAN and control commands. Here, the information on the WAN may include information on available resources in the WAN and available paths, and the control commands may be control commands for controlling a bandwidth and QoS of the path.

The NVA may select a path in the WAN based on the information on the WAN which is received from the WAN controller controlling the WAN, and transfer information on the selected path to the first NVE.

The NVA may transfer the control command to the first DC controller, the second DC controller, and the WAN controller by using the selected path.

The NVA may receive results according to the control command, and information on statuses of the first DC, the second DC, and the WAN according to the control commands, and update network control management information managed by the NVA.

The NVA may instruct the first NVE to perform a tunneling procedure based on the updated network control management information.

Thus, the first NVE may transfer encapsulated packets to the second NVE according to the instruction of performing the tunneling procedure, and the second NVE may configure a path for configuring a virtual network with the first NVE by decapsulating the encapsulated packets.

Further detail will be explained as follows.

Through communications with the WAN controller, the NVA may request the WAN controller to verify available resources and to select available paths in the WAN located between the first NVE and the second NVE (S510). The WAN controller having received the request may select available paths in the WAN according to information on statuses of lower network apparatuses, and transfer information on the selected available paths to the NVA (S511 and S513).

The NVA may select a path to be used for configuring an overlay network based on the information on the available paths transferred from the WAN controller (S520).

The NVA may transfer control commands to the first DC controller, the second DC controller, and the WAN controller by using the selected path (S531, S533, and S535). Here, the control commands may be control commands for controlling a bandwidth and QoS of the selected path.

The first DC controller, the second DC controller, and the WAN controller may perform operations corresponding to the control commands in respective domains (S541, S543, and S545), and transfer results of the operations and updated status information of respective domains to the NVA (S551, S553, and S555).

The NVA may update network control management information based on the results of the operations and the updated status information received from the first DC controller, the second DC controller, and the WAN controller (S560).

The NVA may instruct the first NVE to perform a tunneling procedure based on the updated network control management information (S570).

According to the instruction of tunneling procedure, the first NVA may perform encapsulation on packets (S580). Also, the first NVE may transfer the encapsulated packets to the second NVE (S581).

Accordingly, the second NVE may configure a path for configuring a virtual network with the first NVE by decapsulating the packets (S590).

Figure 6:
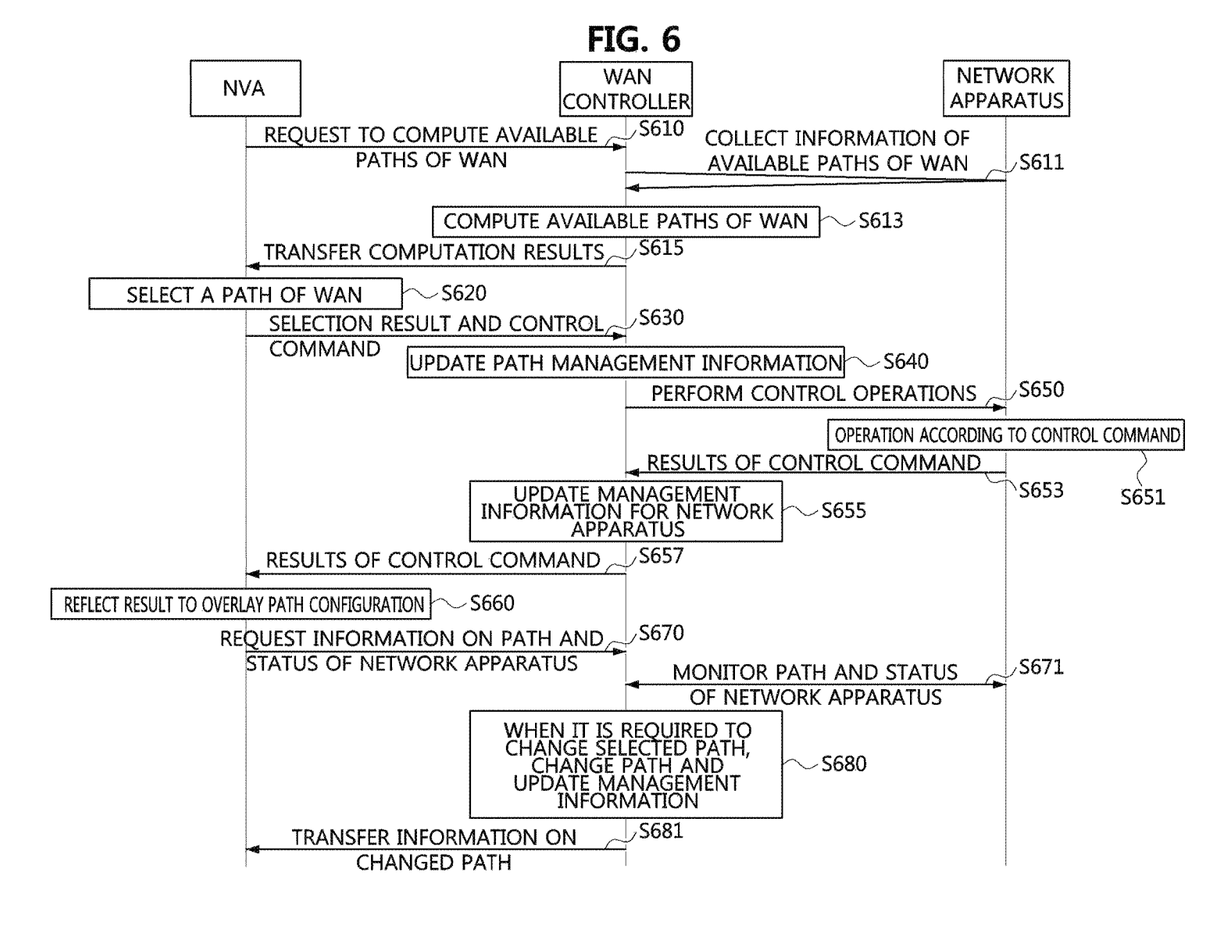
FIG. 6 is an exemplary view to explain interworking between a NVA and a WAN controller for configuration of an overlay network according to an exemplary embodiment of the present invention.

FIG. 6 is an exemplary view to explain interworking between a NVA and a WAN controller for configuration of an overlay network according to an exemplary embodiment of the present invention.

Referring to FIG. 6, a procedure, in which the NVA interworks with the WAN controller in order to configure a path in a WAN based on information on available resources in an underlay network, will be explained in detail.

The NVA may request the WAN controller to compute available paths in the WAN (S610).

According to the request of the NVA, the WAN controller may collect information on available paths in the WAN from network apparatuses located in lower positions (S611), compute available paths in the WAN by using the collected information, and transfer results of the computation to the NVA (S613 and S615).

The NVA may select a path to be used for configuring an overlay network based on the computation results (S620), and transfer the result of selection and control commands for the selected path to the WAN controller (S630).

The WAN controller may update path management information managed by the WAN controller based on the information transferred from the NVA (S640), and transfer the control command transferred from the NVA to corresponding network apparatuses (S650). The network apparatuses may perform operations according to the transferred control command (S651), and transfer results of the operations to the WAN controller (S653). Here, the control command may be a command for controlling bandwidths, QoS, etc. for respective network apparatuses.

The WAN controller may receive the results of the operations from the network apparatuses, transfer the results to the NVA (S657), and update the management information for the network apparatuses managed by it (S655).

Therefore, the NVA may reflect the results of the operations received from the WAN controller to configuration of an overlay path (S660).

Also, the NVA may periodically request status information on the selected path and network apparatuses to the WAN controller (S670). According to the request of the NVA, the WAN controller may monitor statuses of the selected path and the network apparatuses (S671).

In addition, when the WAN controller identifies that it is required to change the selected path, the WAN controller may change the selected path by using a detour path (S680), transfer information on the changed path to the NVA (S681), and update the management information of network apparatuses managed by it (S680).

Figure 7:
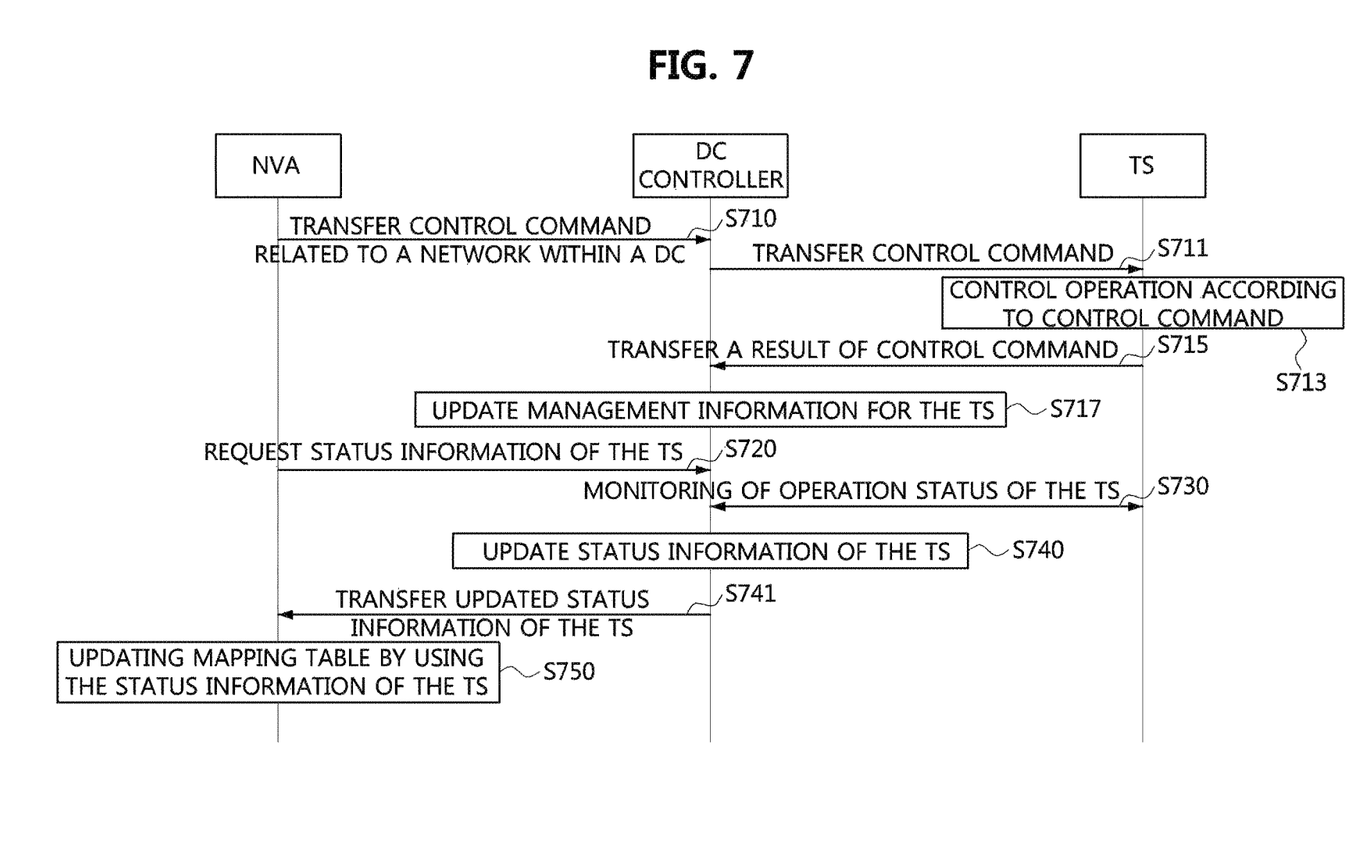
FIG. 7 is an exemplary view to explain interworking between a NVA and a DC controller for configuration of an overlay network according to an exemplary embodiment of the present invention.

FIG. 7 is an exemplary view to explain interworking between a NVA and a DC controller for configuration of an overlay network according to an exemplary embodiment of the present invention.

Referring to FIG. 7, a procedure for exchanging control requests and status information of lower TSs between the NVA and the DC controller will be explained in detail.

The NVA may transfer a control command related to a network within the DC to the DC controller (S710), and the DC controller may transfer the control command to the corresponding TS so that controls for bandwidths, QoS, etc. can be performed (S711 and S713).

After completion of the control operations, the TS may transfer results of the control operations to the DC controller (S715), and the DC controller may update management information of the TS by using the transferred results (S717).

In order for the NVA to perform a main role for configuration of an overlay network, it is required that NVA continuously monitors status information of TSs located in lower positions.

For this, the NVA may request status information of TSs to the DC controller (S720), and the DC controller may continuously monitor operation statuses (e.g. startup, shutdown, migration, etc.) of the TSs according to the request of the NVA (S730).

The DC controller may update the status information of the TSs by using results of the monitoring on operation statuses of the TSs (S740), and transfer the updated status information of the TSs to the NVA (S741).

Also, the NVA 100 may update the mapping table by using the status information of the TSs received from the DC controller (S750).

Figure 8:
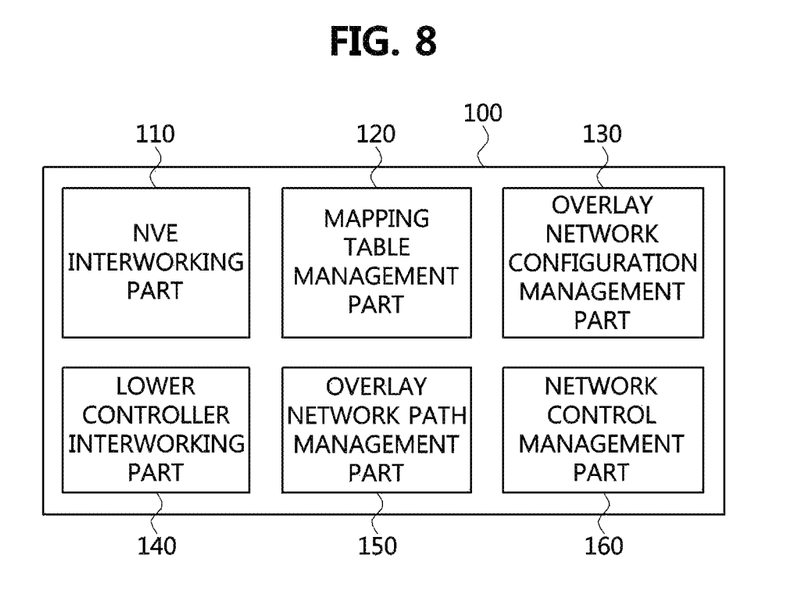
FIG. 8 is a block diagram to explain a NVA for configuration of an overlay network according to an exemplary embodiment of the present invention.

FIG. 8 is a block diagram to explain a NVA for configuration of an overlay network according to an exemplary embodiment of the present invention.

Referring to FIG. 8, a network virtualization authority 100 according to an exemplary embodiment of the present invention may be configured to comprise a NVE interworking part 110, a mapping table management part 120, an overlay network configuration management part 120, a lower controller interworking part 140, an overlay network path management part 150, and a network control management part 160.

The NVE interworking part 110 may manage channels or protocols for communications with a plurality of NVEs.

The mapping table management part 120 may manage a mapping table in which information of NVEs, VNIDs, TSs, etc. related to configuration of an overlay network is stored.

The overlay network configuration management part 130 may manage and control the NVEs 210 and 220, the DC controllers 310 and 320, the WAN controller 400, etc. Also, the overlay network configuration management part 130 may make the mapping table management part 120 update the mapping table by using information received from the NVEs 210 and 220, the DC controllers 310 and 320, and the WAN controller 400.

The lower controller interworking part 140 may manage channels or protocols for communications with lower controllers such as the DC controllers 310 and 320 and the WAN controller 400.

The overlay network path management part 150 may configure and manage an overlay network path based on information on an underlay network.

The network control management part 160 may transfer control commands to the NVEs 210 and 220, the DC controllers 310 and 320, the WAN controller 400, etc., and receive results according to the control commands. For example, the network control management part may control and manage bandwidths and QoS of the underlay network.

The above-described method and apparatus for providing an overlay network by interworking with an underlay network, according to the present invention, configure the overlay network based on information on available resources owned by the underlay network and network statuses of the underlay network, thereby enhancing performance of the overlay network.

In addition, through enhancement of the overlay network performance, overlay-based network virtualization services can be diversified.

While the example embodiments of the present invention and their advantages have been described in detail, it should be understood that various changes, substitutions and alterations may be made herein without departing from the scope of the invention.

The invention claimed is:

1. A method for providing an overlay-based virtual network between data centers (DC) connected with a wide area network (WAN), by interworking with an underlay network, the method comprising:
    identifying, by a network virtualization authority (NVA), accessibility between a source tenant system (TS) connected to a first network virtualization edge (NVE) included in a first DC and a destination TS connected to a second NVE included in a second DC;
    transferring, by the NVA, forwarding information obtained by interworking with the first NVE to the second NVE; and
    configuring, by the NVA, a path by performing a tunneling procedure between the first NVE and the second NVE by using information on the WAN and a control command
    wherein the configuring the path further comprises:
        selecting, by the NVA, a path in the WAN based on information on the WAN which is received from a WAN controller controlling the WAN, and transferring information on the selected path to the first NVE;
        transferring, by the NVA, the control command to a first DC controller controlling the first DC, a second DC controller controlling the second DC, and the WAN controller through the selected path;
        receiving, by the NVA, a result according to the control command, and status information of the first DC, the second DC, and the WAN according to the control command, and updating network control management information managed by the NVA;
        transmitting, by the NVA, the control command instructing the first NVE to perform the tunneling procedure based on the updated network control management information;
        transferring, by the first NVE, a packet encapsulated based on the control command to the second NVE; and
        decapsulating, by the second NVE, the encapsulated packet, and configuring the path for configuring a virtual network with the first NVE.

2. The method according to claim 1, wherein the accessibility is identified by updating a mapping table based on mapping information of the destination TS obtained by the NVA from the second NVE and mapping information of the source TS obtained by the NVA from the first NVE.

3. The method according to claim 2, wherein, in the identifying the accessibility, the first NVE identifies whether the source TS can access the destination TS or not by using the updated mapping table.

4. The method according to claim 2, wherein the mapping information of the source TS is mapping information between a virtual access point (VAP) and a virtual network instance (VNI) connected to the source TS, and the mapping information of the destination TS is mapping information between a VAP and a VNI connected to the destination TS.

5. The method according to claim 1, wherein the forwarding information includes information on a virtual network identifier (VNID) to be used for tunneling for configuring the overlay network, and the VNID is determined by the first NVE based on mapping information between the second NVE and the destination TS which is received from the NVA.

6. The method according to claim 1, wherein the information on the WAN includes information on available resources and available paths within the WAN.

7. The method according to claim 1, wherein the control command includes a command for controlling a bandwidth and a Quality of Service (QoS) of the selected path.

8. A method for providing an overlay-based virtual network between a first data center (DC) and a second DC connected with a wide area network (WAN) by interworking with an underlay network, the method comprising:
    selecting, by a network virtualization authority (NVA), a path in the WAN based on information on the WAN which is received from a WAN controller controlling the WAN, and transferring information on the selected path to a first network virtualization edge (NVE) included in the first DC; and
    transferring, by the NVA, a control command for configuring an overlay network to a first DC controller controlling the first DC, a second DC controller controlling the second DC, and the WAN controller, through the selected path;
    receiving, by the NVA, a result according to the control command and status information of the first DC, the second DC, and the WAN according to the control command, and updating network control management information managed by the NVA;
    transmitting, by the NVA, the control command instructing the first NVE to perform the tunneling procedure based on the updated network control management information;
    transferring, by the first NVE, a packet encapsulated based on the control command to the second NVE; and
    decapsulating, by the second NVE, the encapsulated packet, and configuring the path for configuring a virtual network with the first NVE.

9. The method according to claim 8, wherein the information on the WAN includes information on available resources and available paths within the WAN.

10. The method according to claim 8, wherein the control command includes a command for controlling a bandwidth and a Quality of Service (QoS) of the selected path.

11. A method for providing an overlay-based virtual network between data centers (DC) connected with a wide area network (WAN) by interworking with an underlay network, the method comprising:
    selecting, by a network virtualization authority (NVA), a path in the WAN based on information on the WAN which is received from a WAN controller controlling the WAN, and transferring information on the selected path to a first network virtualization edge (NVE) included in a first DC;
    transferring, by the NVA, a control command for configuring an overlay network to a first DC controller controlling the first DC, a second DC controller controlling a second DC, and the WAN controller, through the selected path;
    receiving, by the NVA, a result according to the control command and status information of the first DC, the second DC, and the WAN according to the control command, and updating network control management information managed by the NVA; and
    transmitting, by the NVA, the control command instructing the first NVE to perform the tunneling procedure based on the updated network control management information
    receiving, by the first NVE, the control command for the tunneling procedure from the NVA;

transferring, by the first NVE, a packet encapsulated based on the control command to a second NVE; and decapsulating, by the second NVE, the encapsulated packet, and configuring a path for configuring a virtual network with the first NVE, wherein the control command for the tunneling procedure is generated based on network control management information updated by using a path selected within the WAN based on information on the WAN which is received by the NVA from a WAN controller controlling the WAN.

12. The method according to claim 11, wherein the information on the WAN includes information on available resources and available paths within the WAN.

* * * * *